United States Patent [19]

Marsh et al.

[11] 3,995,067

[45] Nov. 30, 1976

[54] COFFEE EXTRACTION PROCESS

[75] Inventors: William C. Marsh; James E. Wimmers, both of Marysville, Ohio

[73] Assignee: Societe d'Assistance Technique pour Produits Nestle S.A., Lausanne, Switzerland

[22] Filed: Aug. 6, 1975

[21] Appl. No.: 602,194

[52] U.S. Cl. .............................. 426/387; 23/270 R; 426/432; 426/434
[51] Int. Cl.² ........................................... A23F 1/08
[58] Field of Search ........... 426/432, 434, 386, 387, 426/593, 594; 23/270 R, 267 E, 267 F, 269

[56] References Cited
UNITED STATES PATENTS

| | | | |
|---|---|---|---|
| 2,340,758 | 2/1944 | Kappenberg et al. | 426/432 |
| 3,549,380 | 12/1970 | Patel | 426/432 |
| 3,656,964 | 4/1972 | Mansky et al. | 426/432 |
| 3,790,689 | 2/1974 | Pitchon et al. | 426/434 |

*Primary Examiner*—Frank W. Lutter
*Assistant Examiner*—N. Greenblum
*Attorney, Agent, or Firm*—Watson Leavenworth Kelton & Taggart

[57] ABSTRACT

An improvement to conventional processes for countercurrent extraction of roast ground coffee is disclosed. Therein, fresh roast ground coffee is contacted with previously produced aqueous coffee brew, and then the resultant admixture is added to the extraction zone.

18 Claims, No Drawings

COFFEE EXTRACTION PROCESS

BACKGROUND OF THE INVENTION

The countercurrent extraction of roast ground coffee is well-known in the art and has been accepted as one of the most practical means for producing beverage products. Countercurrent extraction involves a process in which the aqueous medium utilized to extract the coffee first contacts the coffee which has been on-stream the longest period of time. As the medium passes through the extraction zone, it successively contacts coffee having higher and higher contents of coffee solubles. Just prior to exit from the zone, it passes through the freshest of the coffee which is on-stream.

Countercurrent extraction is conventionally practiced through the use of an extraction zone having a plurality of individual percolator or extraction cells, ordinarily three or more. These cells or containers each hold roast ground coffee extracted to greater or lesser degrees and are serially connected so that the aqueous extraction medium passes consecutively through each.

Extraction consists of a series of continuous cycles. Thus, after a pre-selected on-stream period—the time being dependent upon the weight of the extraction medium—i.e. "draw-off"—desired passed through each cell, the cell sequence is shifted. The selection of an appropriate time period, and the corresponding weight of draw-off, depends upon the desired degree of extraction of the coffee. This selection is in turn reflected by the draw-off ratio, which is the weight of aqueous extract to the weight of coffee in a cell. This ratio determines the yield and quality of the eventual beverage product.

The shift is performed through the essentially simultaneous removal of the cell containing the most exhausted or extracted coffee—i.e. the cell at the end of the zone at which the aqueous extraction medium enters—and the addition of a new cell containing fresh, unextracted roast ground coffee at the other end of the zone. Each such shift marks the end of one cycle and the beginning of the next.

A drawback of this prior art countercurrent extraction process lies in the fact that, despite the continuity of extraction cycles, the production of extract is discontinuously cyclic. The new cell added at the downstream end of the extraction zone is initially filled only with particulate roast ground coffee. Thus no extract exits from the zone until that cell first fills with extraction medium. Accordingly, there is a time lag in outflow of extract at the beginning of each cycle.

Also in accordance with prior art coffee beverage processing techniques, extract exiting the extraction zone is customarily first cooled in order to protect against thermally induced flavor degradation and aroma loss and then measured to monitor the yield and ensure the most efficient draw-off for each cycle. Once measured, as by weighing, it is ordinarily passed to further processing which, for example, includes stripping of coffee extract volatiles temporarily to isolate and preserve these materials, concentration of stripped extract, reconstitution of extract with isolated volatiles and then drying.

Because stripping of volatiles is performed at high temperature and, most efficiently, on a continuous basis, further intermediate steps often occur between measuring and stripping the extract. Thus to avoid sporatic stripping resultant from the fact that the extract is not continuously obtained from the extraction zone, the extract is normally introduced into a holding tank. There a sufficient quantity of extract is maintained to permit continuous and steady stripping. Additionally, because the extract has ordinarily been cooled immediately after exit from the extraction zone, it is normally reheated immediately prior to, or during, stripping.

INTRODUCTION TO THE INVENTION

It is an object of the present invention to produce a countercurrent extraction system which is more completely continuous. Thus it is desired to develop a process in which not only extraction, but also the flow of extract, is at a more continuous rate.

It is also an object of this invention to reduce the number of holding and/or cooling steps and the period of time, between the exit of extract from the extraction zone and the removal of volatiles from the extract by stripping.

Another object of this invention is the production of beverage material having enhanced flavor and aroma so as to result in a more desirable beverage product.

These objects, and yet further advantages as are described hereunder, are achieved through the present invention.

DESCRIPTION OF THE INVENTION

This invention revolves about the discovery of the advantages accruing to a pre-treatment of fresh, roast ground coffee before addition to a countercurrent extraction zone. More particularly, this fresh coffee, which is ordinarily held within a container or cell, is moistened with aqueous coffee brew. Only after this pre-treatment is the coffee added to the extraction zone and the extraction medium passed through it.

By "brew" it is meant an aqueous solution containing at least the non-volatile beverage solubles of coffee. In addition, the solution may contain coffee volatiles. Thus, as utilized herein, the term brew encompasses aqueous coffee extract whether or not stripped of its normal volatiles content. These extracts may further be characterized as normally having a soluble solids content of from 10 to 30%, preferably 12 to 18, by total weight. Additionally, like the extraction medium itself, the brew is desirably at a temperature of at least 80° C.

The coffee within a cell is in granular form. Therefore the cell has a substantial intersticial volume which is void. In order fully to take advantage of the present invention, the pre-extraction treatment of the fresh coffee with aqueous coffee brew is performed by filling this cellular void with brew. It additionally appears that some of the brew is physically absorbed into the dry coffee. Conventional grinds of coffee suitable for extraction ordinarily permit the cell to be filled with from about 2 to 3 kilograms of brew per kilogram of fresh coffee.

Up to 10% more brew than the cell will hold is ordinarily utilized in filling the fresh coffee cell. This excess brew overflows the cell and may simply be recycled for further processing. Overflow is desirable, however, because it ensures against leaving any void volume within the cell. Should the cell not be completely filled, there would result a hiatus in the outflow of extract after addition of the cell to the extraction zone.

Another advantage of the present invention resides in the increased period of time during which a new coffee cell may be extracted. Thus in conventional techniques where a fresh cell of dry coffee is utilized, about 50% of the first on-stream cycle is ordinarily consumed in filling the cell and wetting the coffee in the extraction zone. By adding a prefilled cell to the zone, however, extraction occurs throughout the cycle. Thus the efficiency of extraction increases.

Further, because prefilling is performed outside the extraction zone and, preferably during the time of an entire cycle, the rate of flow of aqueous medium into the cell need not be as great as where the cell is filled in the zone. This lowered fill rate permits a slower more controlled diffusing of aqueous medium through the dry fresh coffee. This reduces channeling in the cell and ensures more complete liquid-solid contact for optimum extraction.

In addition to the processing advantages which this prefill of the fresh cell of roast ground coffee offers over the prior art discontinuous techniques, the prefill additionally has been discovered to improve the quality of the eventual beverage product.

One way in which the eventual products are improved involves the fact that greater draw-offs from the newly added cell of fresh coffee are made possible without the disadvantages which normally attend operation at high draw-off ratios. Greater draw-offs yield a more desirable beverage flavor and aroma. Increases in the draw-off, however, have heretofore required increases in the total volume of extraction medium. Thus, the resultant draw-offs have normally been less concentrated and, in order to raise the extract concentration sufficiently for optimum drying, additional water had to be removed. Moreover, because the flavor damage during concentration is ordinarily proportional to the weight of water removed, these draw-offs have been limited by quality considerations.

In accordance with the present invention, however, the draw-off is not increased by additional extraction medium, but rather through the portion of coffee brew utilized to prefill the fresh cell before its addition to the extraction zone. Thus, whereas conventional draw-off ratios have ordinarily ranged from about 2.0 to 3.5:1 on the basis of extract to roast coffee in the fresh cell, the present invention may be performed at from 4.0 to 6.5:1, most preferably from 5.0 to 6.0. Accordingly, the present invention avoids dilution of the eventual extract, but allows greater draw-offs and the accompanying improvement in brew-like flavor.

A further flavor advantage of the present process resides in the increased period of time during which the coffee is extracted. Thus, because the cell is prefilled before addition to the extraction zone, the period of time during and after filling increases that time in which volatiles and other coffee materials may dissolve. This improvement is particularly pronounced in the case of volatiles, because these materials are often less easily solubilized.

Particularly in the case where the fresh coffee is contacted with a brew comprising stripped extract, solubilization of volatiles is enhanced. The contact with stripped extract results in a situation in which the maximum differential of volatiles content between the fresh coffee and an aqueous medium may be found. This results in a faster and more efficient transfer of volatiles to the extraction medium.

In yet another embodiment of the present invention, these advantages may be increased by increasing the period of time in which the fresh cell of coffee contains the prefill brew. This increase may be obtained by holding a cell which has been prefilled with brew for a period of time before it is added to the extraction zone. This permits thorough wetting of the coffee and promotes the transfer of roast coffee flavor and aromatic constituents to the brew. Thus, for example, new cells of fresh coffee may be prefilled one cycle before addition to the zone, held in prefilled state for a complete or partial cycle and only then added to the zone.

The manner in which the brew is added to the fresh cell may be that utilized conventionally for the flow of the aqueous medium in the extraction zone. Thus, it may be passed upwardly through the coffee cells, entering at the bottom and exiting from the top. This upward flow of liquid at a reduced rate through the particulate coffee helps to minimize packing and channeling within the cell and thus increases the homogeneity of liquid-solid contact. Additionally, it minimizes the pressure against the screens or other porous retaining walls which are ordinarily utilized to keep the granular coffee within the cell.

In accordance with a further embodiment of this invention, however, the cell is prefilled with brew by a two-step sequence comprising first adding brew to the cell from its top and then completing filling from the bottom of the cell. More particularly, from about 10 to 50% of the volume of brew necessary to fill the cell is added from the top before the remainder is added from the bottom. This top feeding moistens the coffee thoroughly and creates a bed of coffee more conducive to filtration with reduced tendency toward channeling. Also, as the brew begins to exit from the cell—either through overflow filling or due to passage of extraction medium after addition of the cell to the extraction zone—the surface particles of coffee have already been thoroughly wetted. In this state, these surface particles are not as easily carried along by the exiting liquid. Therefore the number of solid particles of coffee lost from the cell is reduced.

Once the cell has been completely filled with coffee brew, it is ready for addition to the extraction zone and a new extraction cycle may begin. Significantly, however, the cell contains no substantial intersticial void volume, that volume being occupied by the prefill brew. Thus, in contrast to the prior art, as soon as the cell is placed on-stream in the extracton zone, the force exerted by the extraction medium entering the cell forces out brew to maintain a continuous flow of aqueous coffee extract. If the cell were not prefilled as in accordance herewith, then the prior art cyclic and interrupted exit of extract would result. The aqueous extraction medium would first have to fill the void volume before it could exit from the extraction zone.

Coffee extract exiting from the zone at a constant rate is further processed in accordance with one of two different embodiments of the present invention. In the simplest of these embodiments, this extract is split. A portion is redirected as brew to prefill yet another cell containing fresh roast ground coffee while the remainder is passed to the next processing step, such as stripping. In the other, and more preferred embodiment, all the extract is stripped and thereafter, the stripped extract is split, an appropriate portion thereof being redirected to prefill the new cell containing fresh coffee while the remainder is further processed.

Ordinarily this splitting of stripped or unstripped extract is performed continuously throughout each draw-off. Thus, a given fraction of the flow of extract may be redirected to prefill a new, off-stream cell of fresh coffee while the remainder passes continuously to further processing. In this manner, brew for prefill is obtained without any upset to, or change in, the flow rate in any part of the processing system.

In both of these two embodiments, the prior art steps intermediate between extraction and stripping may be eliminated. Primarily responsible for this simplification is the fact that the extract is drawn off continuously from the extraction zone, without interruption between cycles. Accordingly, stripping may be performed in completely continuous manner without need of an intermediate holding tank to ensure a continuous feed of extract for the stripping column.

A substantial conservation of energy also results inasmuch as it is no longer necessary first to cool the extract for holding and then to reheat it for stripping. Extract may pass substantially immediately from the extraction zone, where it is at higher temperature, into the stripper where a high temperature is also desirable. The period of time required for the extract to make this transition has been so reduced that the need for precautions to ensure the stability of the extract against flavor degradation is greatly reduced.

Because extract may be redirected to the extraction zone from at least one point in the extract flow scheme, it is desirable to monitor the extract yield subsequent to that point. Further, because of the continuous production of extract herewith, it is convenient and feasible to postpone monitoring from a point intermediate the extraction and stripping zones where it is customary in the prior art. Accordingly, it is preferred that the extract yield be monitored at a point down-stream of redirection of brew for prefilling and, more preferably, by weighing the stripped extract immediately prior to its concentration.

Upon passage of the aqueous extract to the stripper, the sensitive coffee volatiles are removed and isolated. This isolation may be performed in accordance with the techniques of the prior art. For example, steam may be passed through the hot extract in the stripper to volatilize these flavorant components. Thereafter, the separated vapors of steam and volatiles may be condensed and cooled to protect against flavor degradation, pending return of the volatiles to the further processed extract.

After stripping, the extract is ordinarily concentrated. This step may also be performed by means well-known in the art. Thus, for example, it may be subjected to heat and vacuum to evaporate excess water and to increase its concentration for shipment or for further drying.

Concentrated extract, which ordinarily has a soluble solids content of from about 30–65%, preferably from 45–60%, by total weight may be recombined with previously isolated volatiles to form a concentrated extract having volatiles and other solubles in substantially normal beverage ratio. This concentrated extract which may be diluted or reconstituted with water for beverage consumption, may then be sold. Preferably, however, after admixture with volatiles, the resultant extract is dried to produce a powdered beverage product.

Such drying may again be performed by conventional techniques. Thus, for example, the reconstituted extract may be spray dried. Preferably, however, the extract is freeze dried because this technique ensures maximum retention of full flavor and aroma.

In a still further embodiment, however, a concentrated extract may be dried before reconstitution with the isolate. In this embodiment, the volatiles are added to the powdered beverage material resultant from drying. Thus, for example, concentrated volatiles may simply be sprayed onto the dried powder. Then, if necessary, the sprayed powder may again be subjected to drying for a very short period of time sufficient to remove excess liquid.

The continuous nature and the composition of the present extract permit certain further advantages pursuant to this invention. More particularly, because the practice of the present invention does not require a holding tank intermediate the extraction and strippng zones, the coffee extract draw-off during an extraction cycle is, and remains for some time, heterogeneous. Thus, the composition of the extract is dependent upon the stage, or point in time during the cycle, of the draw-off to which it belongs.

For example, extract exiting the extraction zone at the beginning of a given cycle will exhibit a higher concentration of coffee solubles and coffee aromatics than extract of the end of that cycle or draw-off. These differences in concentrations result from the fact that, at the beginning of the cycle, the roast ground coffee contacted by the extraction stream has not been as heavily extracted as later in the same cycle. At the end of the cycle, however, the coffee, including that in the last cell of the extraction zone, has been at least partially extracted pursuant to the preceding draw-offs or stage of the draw-off cycle. Consequently, it is lower in its content of coffee solubles and aromatics and this is reflected by a decreased concentration of these materials in the latter stages of the draw-off.

This decline in extract concentratiomn of beverage constituents within each cycle is, of course, not new. It is an inherent function of any extraction process. It is not believed, however, that it has heretofore been possible to take substantial advantage of this concentration differential. Thus, because the prior art processing systems have required the use of one or more holding tanks intermediate between the extraction zone and further processsng, this concentration difference has previously disappeared as the different stages of the draw-off were intermingled in the holding tank.

The present process, however, allows completely continuous processing of at least most extract without holding. It is therefore possible selectively to treat the different stages of extract. This selectivity, in turn, allows maximum flavor retention in the eventual beverage product.

Accordingly, a further embodiment of the present invention involves processing this first stage of up to about 70%, preferably between 30 and 60%, of the extract directly through the entire processing sequence. Thus this stage of the extract may be passed directly from the extraction zone to the stripper and then to concentration and, if desired, dried. Only the second or last stage of extract, or of stripped extract as the case may be, is redirected to prefill a new cell of fresh roast ground coffee. Of course, not all of this last stage of the draw-off need be utilized to prefill the new cell. The last stage can itself be continuously split as previously described, with part being redirected and the remainder being passed to further processing stages. In accordance with this embodiment, the discontinuous and selective redirection of extract does impart some variation in the flow rate of extract through parts of the present process. Accordingly, it may be desirable to insert holding tanks in the flow pattern after the point at which brew is redirected. If desired, a holding tank may also be inserted at the point prior to entry of the brew into the new cell of fresh coffee.

Even in those cases where a holding tank is necessary, however, the flow of extract is usually only varied, and not interrupted as in the case of prior art systems. Also, the tanks can be considerably smaller and the retention times substantially reduced. The minor disadvantages of these variations in flow are more than compensated by the increase in process efficiency and the superiority of the resultant beverage product. Accordingly, this selective redirection of only a late stage, or portion of a late stage, of a draw-off for prefilling constitutes a particularly preferred embodiment of the present invention.

As previously indicated, the concentration of volatiles in the darw-off also varies, that concentration diminishing at later stages of the draw-off. It is also desired to take advantage of this aspect of the present invention. Accordingly, stripping of the extract may be monitored within each cycle so as to permit use of only the first stage of stripped aromatics from each draw-off. This first stripped isolate will be substantially higher in volatiles concentration than any isolate stripped from a later stage. For example, with steam stripping, isolate obtained during the first stage of each draw-off will exhibit a concentration of volatiles in condensed steam which may be from 2 to 3 or more times as high as that obtained from later stages of draw-off.

The selective use of only the first stripped isolate of each draw-off is adequate for reconstitution of the eventual beverage material. Thus, for example, these isolates may comprise the volatiles stripped from up to the first 70%, preferably the first 30 to 60%, of each draw-off. These isolates exhibit volatiles concentrations substantially higher than have been obtained in the prior art. Reconstitution with first stripped isolate therefrom minimized the dilution factor upon addition of isolate to beverage material.

In a further embodiment, stripping may be conducted at a higher than conventional rate — e.g. utilizing more steam. This provides an improved yield and spectrum of volatiles. Moreover, because isolate — i.e. volatiles and condensed steam — is collected from only the first portion of each draw-off, its total volume is not increased. Consequently, this isolate can be added directly to concentrated extract so as to provide desired flavor without undue dilution.

The following examples are further illustrative of the invention.

EXAMPLE I

Roast ground coffee was extracted with water in a countercurrent extraction zone having six serially-connected cells containing coffee. Extraction was carried out at a draw-off ratio of 6.0.1. Immediately after exit from the extraction zone, the stream of extract was continuously split into two portions of 60%, and 40% by total weight. The 40% portion was directed to a new, off-stream cell containing fresh roast ground coffee. It completely filled the intersticial voids of that cell and wet the coffee over the one cycle time period in which it was slowly added.

The remaining 60% of the extract exiting from the zone was passed to a steam stripping column where volatiles were removed, condensed and isolated. The stripped extract, having a soluble solids concentration of 17% by weight, was then subjected to vacuum evaporation to produce a concentrated extract having a solids concentration of 60% by weight.

The concentrated extract was then reconstituted with a concentrate of the volatiles removed in the stripping column, frozen, and freeze dried to produce an instant coffee powder having a moisture content of about 3% by weight.

Simultaneous with the treatment of the first, 60% portion of extract, extraction in the countercurrent zone continued. After completion of each cycle, a new cell of fresh coffee filled with brew during that cycle was connected at the downstream end of the extraction zone while the most extracted cell in the zone was removed. As each new cycle began, the 40% portion of extract split was redirected to yet another cell containing fresh roast ground coffee in order to permit continuous operation of the process. Significantly, the exit of aqueous coffee extract from the extraction zone continued at a constant rate, uninterrupted by changes in extraction cycle.

EXAMPLE 2

The process of Example 1 was repeated with the change that all aqueous extract exiting from the extraction zone was passed directly to the stripper and only thereafter split into portions of 60% and 40% by weight of stripped extract.

In the process of this example, the new cells containing fresh roast ground coffee were prefilled wit a brew comprising stripped extract. Again, at no time did the rate of flow of extract through the process scheme vary in accordance with the cycle of extraction.

EXAMPLE 3

The process of Example 2 was repeated with the change that stripped volatiles were recovered from the first 50% of draw-off of each cycle. Without being concentrated, this volatiles isolate was utilized in the reconstitution of extraction preparatory to drying.

The technique utilized in splitting the stripped extract to obtain a portion for recycling was also changed. Instead of splitting the extract continuously over the entire draw-off in a ratio of 60 to 40%, all of the first 50% of draw-off of each cycle was passed directly to concentration and further processing. Only the last 50% of draw-off of each cycle was split and that, continuously in a ratio of 75 to 25%. The 25% latter portion of draw-off was passed directly to concentration and further processing. The 75% latter portion was redirected to prefill a new cell of fresh roast ground coffee.

In order to permit prefilling of the new cell at low feed rate, the process of this example included reservation of two new cells of roast ground coffee. Accordingly, one of the cells was filled over the period of time normal for a complete cycle, but because filling began in the middle of one cycle, it extended to the middle of the next. With the availability of the second new cell which had previously been prefilled and then maintained for one-half of a cycle in filled condition, a new cell of fresh roast ground coffee was available for addition to the extraction zone at the beginning of each cycle.

EXAMPLE 4

The process of Example 1 was repeated. Instead of prefilling each new cell containing fresh roast ground coffee solely from the bottom upward, however, the first 25% of redirected extract was added to the cell from the top. Thereafter, the remaining 75% of redirected extract (30% of the total extract exiting the extraction zone) was fed into the cell from the bottom to complete prefilling.

It was observed that extract monitored immediately prior to stripping contained substantially fewer entrained particulate coffee solids than the corresponding extract of Example 1. This desirable reduction in particulates content was attributed to the lowered tendency of the top-filled coffee in the most downstream cell in the extraction zone to be swept from the cell by the exiting extraction medium.

We claim:

1. In a process for the production of beverage material comprising countercurrently passing an aqueous medium through an extraction zone comprising at least three serially-connected cells containing roast, ground coffee to produce coffee extract, the cells of said zone being changed for successive extraction cycles, during which a draw-off of said extract occurs, by removing the end cell containing the most exhausted coffee and adding a cell containing fresh coffee at the opposite end of said zone, the improvement wherein said cell containing fresh coffee is filled completely with aqueous coffee brew prior to addition to said zone whereby said extract flows continuously from said extraction zone.

2. The process of claim 1, wherein from about 10 to 50% of the coffee brew with which the cell is filled is added at the top of said cell and thereafter the remainder of said brew is introduced to said cell from its bottom.

3. The process of claim 1, wherein the brew with which the cell containing fresh coffee is filled comprises coffee extract.

4. The process of claim 3, wherein the cell containing fresh coffee is filled at a substantially constant rate during one entire extraction cycle.

5. The process of claim 4, wherein the cell is filled, held in filled condition for at least a part of a cycle, and then added to the extraction zone.

6. The process of claim 3, wherein the extract produced in the extraction zone is split into two portions, a first portion comprising beverage material and a second portion comprising brew which is introduced into and fills the cell containing fresh coffee.

7. The process of claim 6, wherein the first and second portions are split continuously from the entire extract.

8. The process of claim 6, wherein the second portion comprising brew is split from the extract only after up to 70% of the draw-off of each cycle has been obtained.

9. The process of claim 6, wherein the first portion is conveyed to a stripping zone for isolation of coffee volatiles, the resultant stripped extract is concentrated, isolated coffee volatiles are admixed therewith, and the resultant admixture is dried.

10. The process of claim 9, wherein the isolated coffee volatiles admixed with the first portion of extract after stripping consist of volatiles stripped from up to the first 70% of extract of a draw-off cycle.

11. The process of claim 1, wherein the brew with which the cell containing fresh coffee is filled comprises coffee extract which has been substantially stripped of coffee volatiles.

12. The process of claim 11, wherein the cell containing fresh coffee is filled at a substantially constant rate during one entire extraction cycle.

13. The process of claim 12, wherein the cell is filled during one extraction cycle, held in filled condition for at least a part of a cycle, and then added to the extraction zone.

14. The process of claim 11, wherein the extract produced in the extraction zone is conveyed to a stripping zone for isolation of coffee volatiles and the stripped extract is split into two portions, a first portion comprising beverage material and a second portion comprising brew which is introduced into and fills the cell containing fresh coffee.

15. The process of claim 14, wherein the first and second portions are split continuously from the entire stripped extract.

16. The process of claim 14, wherein the second portion comprising brew is split from the stripped extract only after up to 70% of the draw-off of each cycle has been obtained.

17. The process of claim 14, wherein the first portion is concentrated, isolated coffee volatiles are admixed therewith, and the resultant admixture is dried.

18. The process of claim 17, wherein the isolated coffee volatiles admixed with the first portion consist of volatiles stripped from up to the first 70% of extract of a draw-off cycle.

* * * * *